US012704641B2

(12) United States Patent
Im et al.

(10) Patent No.: US 12,704,641 B2
(45) Date of Patent: Aug. 11, 2026

(54) POSITIONING SYSTEM AND POSITIONING METHOD USING LOW EARTH ORBIT SATELLITE

(71) Applicant: Korea Aerospace Research Institute, Daejeon (KR)

(72) Inventors: Sung Hyuck Im, Daejeon (KR); Kee Joo Lee, Daejeon (KR); Jae Sung Park, Daejeon (KR)

(73) Assignee: Korea Aerospace Research Institute, Daejeon (KR)

( * ) Notice: Subject to any disclaimer, the term of this patent is extended or adjusted under 35 U.S.C. 154(b) by 253 days.

(21) Appl. No.: 18/689,014

(22) PCT Filed: Oct. 12, 2022

(86) PCT No.: PCT/KR2022/015380
§ 371 (c)(1),
(2) Date: Mar. 4, 2024

(87) PCT Pub. No.: WO2023/075215
PCT Pub. Date: May 4, 2023

(65) Prior Publication Data
US 2024/0369718 A1 Nov. 7, 2024

(30) Foreign Application Priority Data
Nov. 1, 2021 (KR) ........................ 10-2021-0148112

(51) Int. Cl.
*G01S 19/25* (2010.01)
*G01S 19/22* (2010.01)

(52) U.S. Cl.
CPC ............ *G01S 19/254* (2013.01); *G01S 19/22* (2013.01); *G01S 19/256* (2013.01)

(58) Field of Classification Search
CPC ....... G01S 19/254; G01S 19/22; G01S 19/256
(Continued)

(56) References Cited

U.S. PATENT DOCUMENTS 6,107,959 A 8/2000 Levanon
11,726,213 B2 * 8/2023 Mu .................... H04B 7/18552 342/352
2013/0065514 A1 3/2013 Whelan et al.

FOREIGN PATENT DOCUMENTS

EP 2741108 A1 11/2014
JP 05218928 8/1993
(Continued)

OTHER PUBLICATIONS

Iannucci, Peter A., "Economical Fused LEO GNSS," Radionavigation Laboratory, The University of Texas at Austin, Austin, TX, 426-443 (2020).

(Continued)

*Primary Examiner* — Harry K Liu
(74) *Attorney, Agent, or Firm* — Meunier Carlin & Curfman LLC

(57) ABSTRACT

Disclosed are a positioning system and a positioning method using a low earth orbit satellite. The positioning system using a low earth orbit satellite according to the present invention comprises a generation unit for generating, when a communication period with a ground control station is reached, a first telemetry signal including a time value according to a reference time used by a low earth orbit satellite; a confirmation unit for confirming, on the basis of a navigation signal received from a navigation satellite, the GNSS time used as a reference by the navigation satellite; an adjustment unit for adjusting the time value in the first telemetry signal so as to be synchronized with the GNSS time; and a transmission unit for broadcast transmitting a second telemetry signal, after the adjustment, so that a positioning receiver on the ground can determine the position by using the second telemetry signal.

9 Claims, 7 Drawing Sheets

(58) Field of Classification Search
USPC .......................................................... 342/352
See application file for complete search history.

(56) References Cited

FOREIGN PATENT DOCUMENTS

| | | |
|---|---|---|
| JP | 3432709 | 8/2003 |
| JP | 3524018 | 4/2004 |
| JP | 2014531803 | 11/2014 |
| JP | 2010266390 | 11/2020 |
| JP | 2021128098 | 9/2021 |
| KR | 1020160057425 | 5/2016 |
| KR | 10-2020-0083030 | 7/2020 |

OTHER PUBLICATIONS

Spiridonov, Alexander, "Small Satellite Orbit Determination Using The University Ground Station," Physics and Aerospace thechnology, Belarusian State University, 113-117 (2020).

* cited by examiner

Table A-3. Major frame length = minor frame maximum length multiplied by Z

Minot frame maximum length, N words or B bits
Class I shall not exceed 8192 bits nor exceed 1024 words. Class II: 16 384 bits.

| | Word 1 | Word 2 | Word 3 | Word 4 | Word 5 | Word 6 | Word 7 | Word 8 | Word 9 | Word 10 | ... | Word N-2 | Word N-1 |
|---|---|---|---|---|---|---|---|---|---|---|---|---|---|
| Minor frame sync pattern | SFID= 1 | FFI | Param A2 | Param B1 | Param A4 | Param A2 | Param A5 | Param A6 | Param A2 | Param C1 | ... | Param A2 | Param A(X) |
| | SFID= 2 | | | Param B2 | | | | | | Param C2 | | | |
| | SFID= 3 | | | Param B3 | | | | | | Param C3 | | | |
| | SFID= 4 | | | Param B4 | | | | | | Param C4 | | | |
| | SFID= 5 | | | Param B2 | | | | | | Param C5 | | | |
| | SFID= 6 | | | Param B5 | | | | | | Param C6 | | | |
| | SFID= 7 | | | Param B6 | | | | | | Param C7 | | | |
| | ⋮ | | | ⋮ | ⋮ | | | | | ⋮ | | | |
| | ⋮ | | | Param B2 | | | | | | Param C(Z-1) | | | |
| Minor frame sync pattern | SFID= Z | FFI | Param A2 | Param BZ | Param A4 | Param A2 | Param A5 | Param A6 | Param A2 | Param CZ | ... | Param A2 | Param A(X) |

The frame format identifier(word 2) is shown in the preferred position as the first word following ID counter. Parameters B1, B3, B4, B5, ... BZ, and C1, C2, C3, ... , CZ are sampled once each subframe, at 1/Z multiplied by the minor frame rate. Parameter B2 is supercommutated on the subframe and is sampled at less than the minor frame rate, but greater than the subframe rate.

POSITIONING SYSTEM AND POSITIONING METHOD USING LOW EARTH ORBIT SATELLITE

TECHNICAL FIELD

The following description relates to a satellite-based positioning system, and more specifically, to a positioning system using a telemetry signal generated in a low earth orbit satellite.

BACKGROUND ART

In general, a satellite-based positioning system may provide a positioning service in a wider range of an area compared to a ground-based positioning system, and thus has been commercialized in various industrial fields providing location-based services.

A typical positioning system mainly uses a high or medium earth orbit satellite of which an altitude is relatively high to increase the accuracy of a position value. Even a low earth orbit satellite transmits a telemetry signal to a ground control station to relay various kinds of information, such as a satellite status, to the ground control station.

Accordingly, when a navigation signal transmitted from a high earth orbit satellite or a medium earth orbit satellite is not readily available, a telemetry signal transmitted from a low earth orbit satellite may be used as an alternative. However, the telemetry signal transmitted from the low earth orbit satellite is being transmitted to the ground without synchronization with a reference time of a navigation satellite, and thus may be limitedly applied to a positioning system that needs to specify a current position precisely.

SUMMARY

Technical Goals

An aspect provides technology for, when transmitting a telemetry signal generated in a low earth orbit satellite to a ground control station, synchronizing the telemetry signal with a reference time (a global navigation satellite system (GNSS) time) of a navigation signal transmitted from a typical navigation satellite and enabling the telemetry signal of the low earth orbit satellite to be used in a positioning receiver on the ground to perform positioning.

Technical Solutions

A positioning system using a low earth orbit satellite according to the present disclosure includes, when a communication period with a ground control station arrives, a generator configured to generate a first telemetry signal including a time value according to a reference time used by the low earth orbit satellite, a verifier configured to verify a global navigation satellite system (GNSS) time that is used as a reference by a navigation satellite from a navigation signal received from the navigation satellite, an adjuster configured to adjust the time value included in the first telemetry signal to be synchronized with the GNSS time, and a transmitter configured to broadcast-transmit a second telemetry signal obtained through adjustment and cause a positioning receiver on the ground to perform positioning by using the second telemetry signal.

In addition, a positioning method using a low earth orbit satellite according to the present disclosure includes, when a communication period with a ground control station arrives, generating a first telemetry signal including a time value according to a reference time used by the low earth orbit satellite, verifying a GNSS time that is used as a reference by a navigation satellite from a navigation signal received from the navigation satellite, adjusting the time value included in the first telemetry signal to be synchronized with the GNSS time, and broadcast-transmitting a second telemetry signal obtained through adjustment and cause a positioning receiver on the ground to perform positioning by using the second telemetry signal.

Effects

According to the present disclosure, by synchronizing a telemetry signal periodically generated in a low earth orbit satellite for reporting a satellite status with a reference time (a global navigation satellite system (GNSS) time) of a navigation signal and transmitting the synchronized telemetry signal, a positioning receiver on the ground may determine a precise position value by using the telemetry signal as if using the navigation signal.

According to the present disclosure, even when a signal of a high/medium earth orbit satellite is not available, precise positioning may be performed by using a telemetry signal of a low earth orbit satellite, and thus, seamless provision of various location-based services may be supported.

According to the present disclosure, the use of a telemetry signal generated in a low earth orbit satellite may be extended beyond the typical use for reporting a satellite status.

These and other features and advantages of the invention will become apparent to those skilled in the art from the following description and the accompanying drawing. It should be understood, however, that the detailed description and specific examples, while indicating a preferred embodiment of the present invention, are given by way of illustration and not of limitation. Many changes and modifications may be made within the scope of the present invention without departing from the spirit thereof, and the invention includes all such modifications.

BRIEF DESCRIPTION OF DRAWINGS

FIGS. 3 to 5 are diagrams each illustrating a frame structure of a telemetry signal in the positioning system using a low earth orbit satellite according to an embodiment;

DETAILED DESCRIPTION OF THE PREFERRED EMBODIMENTS

Figure 1:
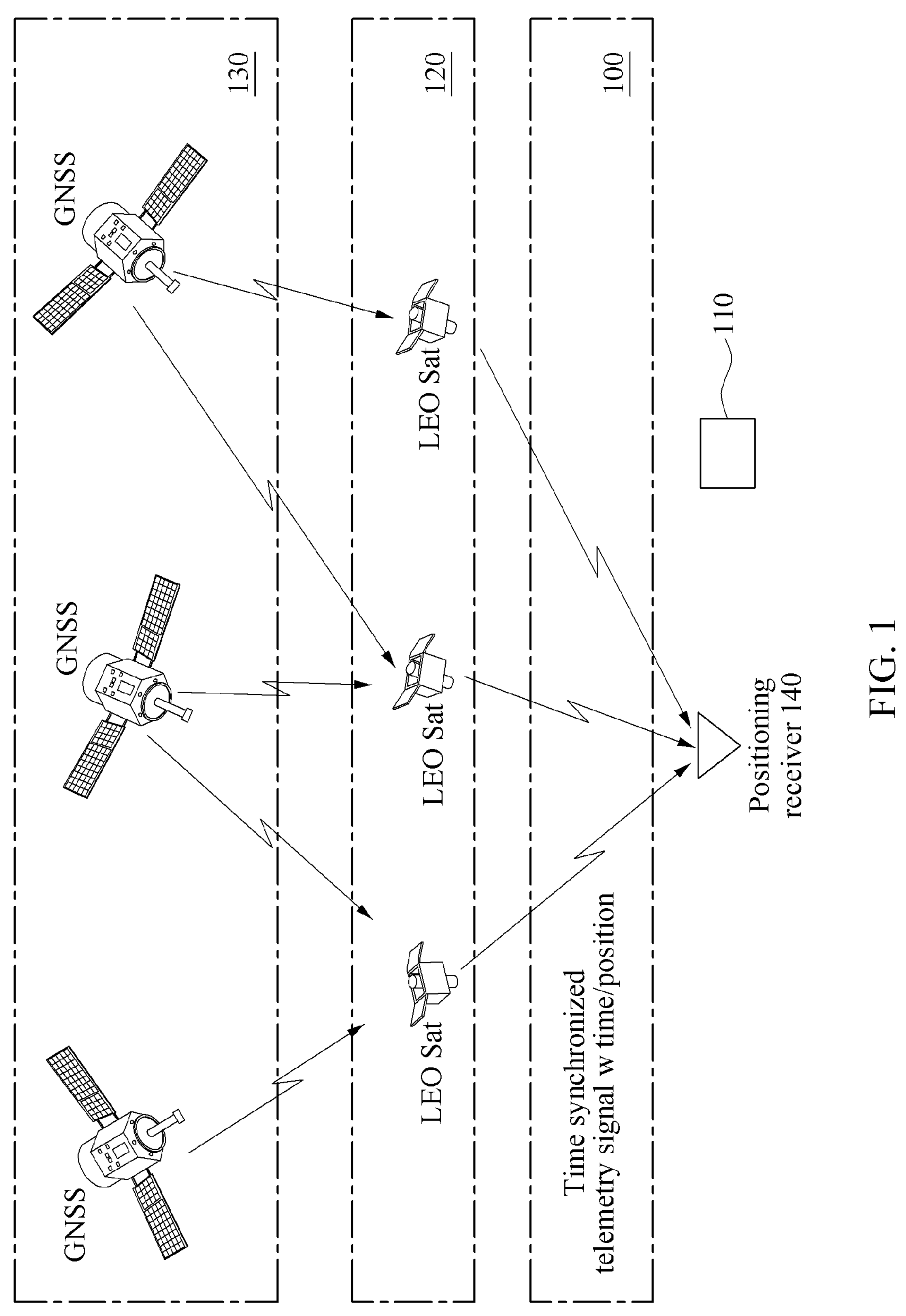
FIG. 1 is a conceptual diagram illustrating a positioning system using a low earth orbit satellite according to an embodiment.

Hereinafter, examples will be described in detail with reference to the accompanying drawings. However, various alterations and modifications may be made to the embodiments. Here, the embodiments are not construed as limited to the disclosure. The embodiments should be understood to include all changes, equivalents, and replacements within the idea and the technical scope of the disclosure.

The terminology used herein is for the purpose of describing particular embodiments only and is not to be limiting of the embodiments. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

When describing the embodiments with reference to the accompanying drawings, like reference numerals refer to like constituent elements and a repeated description related thereto will be omitted. In the description of embodiments, detailed description of well-known related structures or functions will be omitted when it is deemed that such description will cause ambiguous interpretation of the present disclosure.

FIG. 1 is a conceptual diagram illustrating a positioning system using a low earth orbit satellite according to an embodiment.

Referring to FIG. 1, a ground control station 110 may receive a first telemetry signal transmitted by a low earth orbit satellite (LEO Sat) 120 during a communication period with the LEO Sat 120.

The first telemetry signal includes various kinds of collected data and satellite status data generated by the LEO Sat 120 during a non-communication period before the communication period. Accordingly, the ground control station 110 may identify the status of the LEO Sat 120 through the first telemetry signal.

The LEO Sat 120 may transmit the first telemetry signal according to a time value included in the first telemetry signal and the time value may be determined according to a reference time used in the LEO Sat 120.

A navigation satellite (a ground navigation satellite system (GNSS)) 130 transmits a navigation signal used in a typical positioning system, such as a global positioning system (GPS), a Globalnaya Navigazionnaya Sputnikovaya Sistema (GLONASS), Galileo, or BeiDou.

As illustrated in FIG. 1, the LEO Sat 120 may be different from the GNSS 130 in an altitude or an orbital period. Thus, there may be an error between a reference time in the LEO Sat 120 and a reference time (hereinafter, the "GNSS time") in the GNSS 130.

Due to the error, the first telemetry signal transmitted by the LEO Sat 120 may not be readily used as the same as a navigation signal when performing positioning.

Accordingly, a positioning system 100 using the LEO Sat 120 according to an embodiment may synchronize the first telemetry signal transmitted by the LEO Sat 120 with the GNSS time and transmit a synchronized signal to the ground.

To do so, the positioning system 100 may transmit a second telemetry signal to the ground, in which a time value (a start time value of a frame sync pattern) indicating a transmission time synchronized with the GNSS time is added to a frame including a time value (the frame sync pattern) indicating an original transmission time of the first telemetry signal.

When the start time value of the frame sync pattern arrives, the positioning system 100 may transmit the second telemetry signal according to an optimal frame synchronization pattern (the frame sync pattern) provided by Inter-Range Instrumentation Group (IRIG) standard 106.

Accordingly, a positioning receiver 140 on the ground, which receives the second telemetry signal, may perform positioning with high accuracy by using the second telemetry signal as if using a navigation signal.

Figure 2:
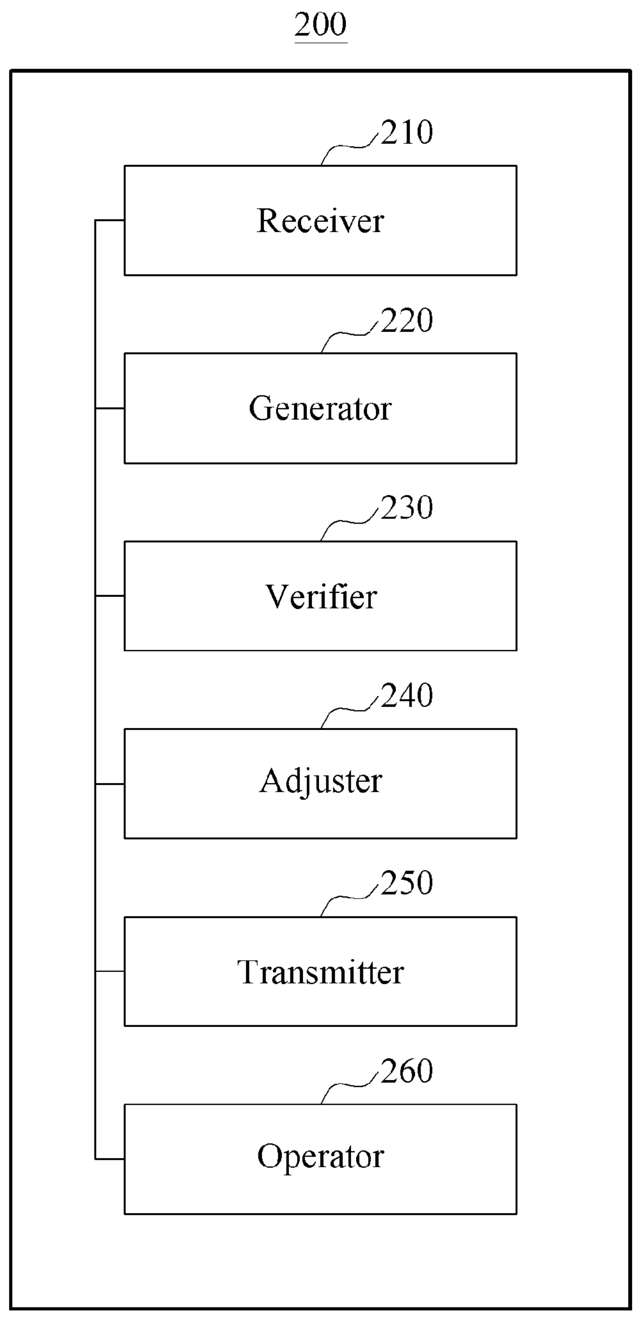
FIG. 2 is a block diagram illustrating an internal configuration of the positioning system using a low earth orbit satellite according to an embodiment.

FIG. 2 is a block diagram illustrating an internal configuration of the positioning system using a low earth orbit satellite according to an embodiment.

Referring to FIG. 2, a positioning system 200 using a low earth orbit satellite according to an embodiment may include a receiver 210, a generator 220, a verifier 230, an adjuster 240, a transmitter 250, and an operator 260.

When a communication period with a ground control station arrives, the generator 220 may generate a first telemetry signal including a time value according to a reference time used in the low earth orbit satellite.

The time value may be a transmission time of the first telemetry signal. The first telemetry signal may be generated as a frame structured according to IRIG standard 106 as illustrated in FIG. 3, and the time value may be put in the frame as a "frame sync pattern" as illustrated in FIG. 4.

In general, the low earth orbit satellite may generate various kinds of collected data through ground observation or generate satellite status data during a non-communication period before the communication period. When the communication period arrives, the receiver 210 may receive the collected data or the status data from the low earth orbit satellite.

Figure 4:
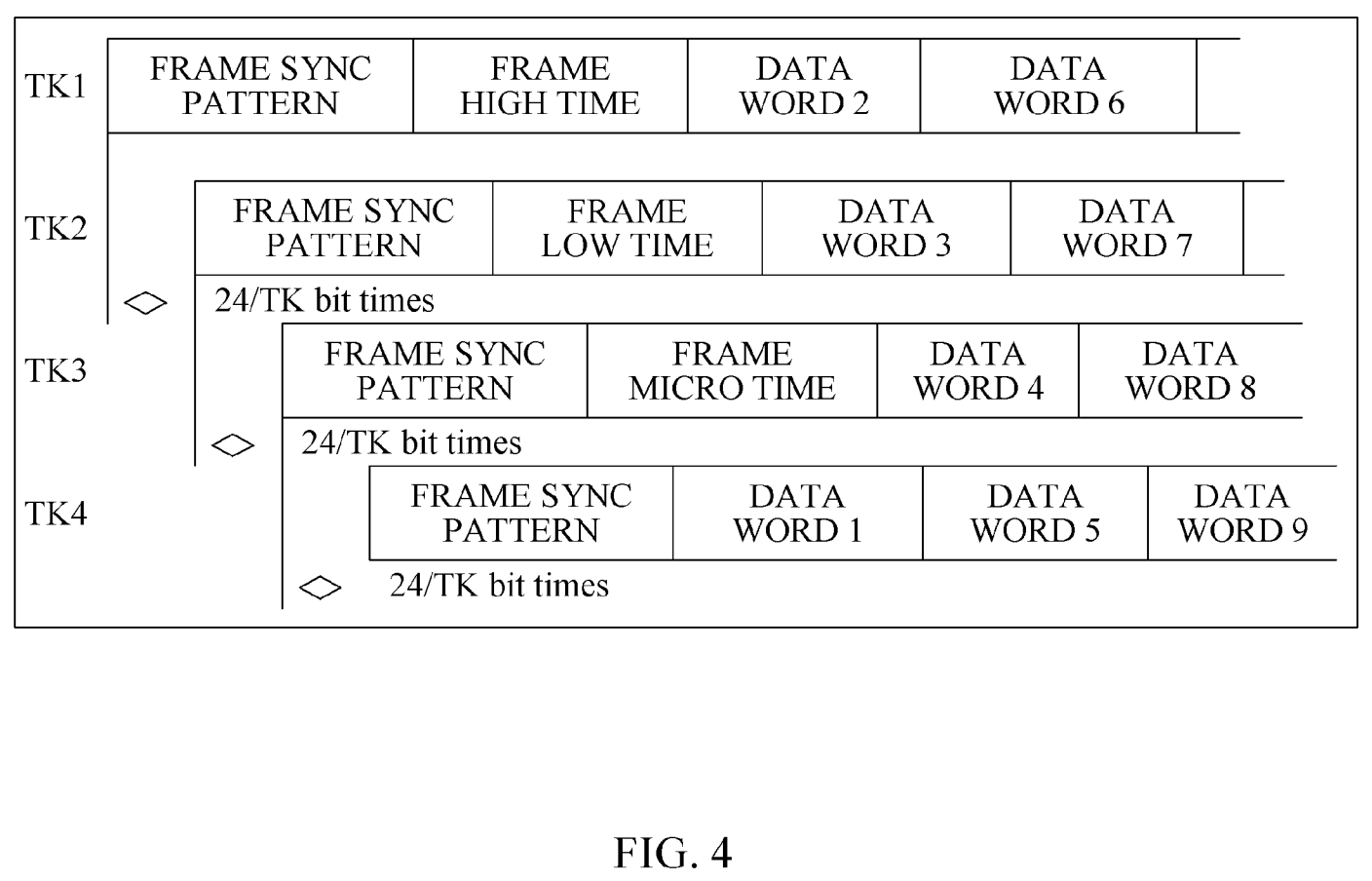

During the communication period, the generator 220 may put the collected data or the status data relayed by the low earth orbit satellite as data words of the frame as illustrated in FIG. 4 and may generate the first telemetry signal.

In this case, the generator 220 may generate encrypted data by encrypting the collected data or the status data relayed from the low earth orbit satellite in a format designated by the ground control station such that the data relayed from the low earth orbit satellite may not be exposed to any positioning receiver other than the ground control station and may generate the first telemetry signal further including the encrypted data.

The receiver 210 may receive a navigation signal transmitted by a typically known navigation satellite (GNSS), such as a GPS, a GLONASS, Galileo, or BeiDou. The verifier 230 may verify a GNSS time used as a reference by the navigation satellite from the navigation signal received from the navigation satellite.

The adjuster 240 may adjust a time value in the first telemetry signal to be synchronized with the GNSS time.

Compared with the navigation satellite, a low earth orbit has a low altitude and a relatively short orbital period, which is within 2 hours. Thus, a reference time used in the low earth orbit satellite may have a time difference (an error) with the GNSS time of the navigation satellite.

Due to the difference in the reference time, the first telemetry signal is transmitted while not synchronized with the GNSS time. Accordingly, the accuracy of a position value obtained by performing positioning according to the first telemetry signal in a positioning receiver receiving the first telemetry signal on the ground may decrease.

Therefore, the adjuster 240 may calculate the error of the reference time of the low earth orbit satellite based on the GNSS time and may adjust the time value associated with a transmission time of the first telemetry signal by applying the error.

Referring to FIG. 3, the first telemetry signal may be generated as a frame structured according to IRIG standard 106. Referring to FIG. 4, the time value of the first telemetry signal may be put in the frame as a "frame sync pattern".

In this state, in a frame included in a second telemetry signal obtained through adjustment, a "frame sync pattern start time value", which is synchronized with the GNSS time by applying the error, may be additionally put after the "frame sync pattern".

In this case, the "frame sync pattern" may be the transmission time of the first telemetry signal not synchronized with the GNSS time and the "frame sync pattern start time value" may be a transmission time of the second telemetry signal synchronized with the GNSS time.

In addition, a position value of the low earth orbit satellite at the time when a navigation signal that is used to calculate the error is received may be additionally put in the frame of the second telemetry signal together with the "frame sync pattern start time value".

Accordingly, the adjuster 240 may verify whether a change of a movement trajectory of the low earth orbit satellite according to the position value of the low earth orbit satellite at the time when the error is calculated is within a designated threshold, may apply the calculated error to the time value of the first telemetry signal when the change is within the designated threshold, and may perform synchronization with the GNSS time while reducing an error caused by a multipath of the low earth orbit satellite.

According to an embodiment, to reduce the error caused by the multipath of the low earth orbit satellite with fast Doppler, the positioning system 200 using the low earth orbit satellite may average the movement trajectory of the low earth orbit satellite moving at a fast speed in a short time and may reflect the averaged movement trajectory when adjusting the time value of the first telemetry signal.

Specifically, the operator 260 may operate unit movement trajectories of the low earth orbit satellite at a predetermined unit time interval according to the position value of the low earth orbit satellite that is identified by the navigation signal, and the adjuster 240 may calculate the error between the GNSS time and the reference time of the low earth orbit satellite such that an average movement trajectory obtained by averaging the unit movement trajectories is within the designated threshold and may adjust the time value in the first telemetry signal by applying the calculated error.

Accordingly, according to an embodiment, while reducing the error caused by the low earth orbit satellite with fast Doppler, a telemetry signal of the low earth orbit satellite may be synchronized with the GNSS time and may be transmitted to the ground such that the positioning receiver on the ground may perform positioning with high accuracy.

The transmitter 250 may broadcast-transmit the second telemetry signal obtained through adjustment and may enable the positioning receiver on the ground may perform positioning by using the second telemetry signal.

As the second telemetry signal is broadcast-transmitted, the ground control station may identify the status of the low earth orbit satellite through the second telemetry signal, and the positioning receiver on the ground may perform positioning with high accuracy through the second telemetry signal.

According to an embodiment, the transmitter 250 may transmit the first telemetry signal to the ground control station when broadcast-transmitting the second telemetry signal. In this case, the transmission of the first telemetry signal and the transmission of the second telemetry signal may be performed in parallel.

In other words, the transmitter 250 may transmit the first telemetry signal to be transmitted to the ground control station without synchronization with the GNSS time and may allow the ground control station to promptly identify the status of the low earth orbit satellite through the first telemetry signal.

At the same time, the transmitter 250 may transmit the second telemetry signal to be broadcast-transmitted to the positioning receiver on the ground without data encryption from the low earth orbit satellite and may allow the positioning receiver on the ground to promptly perform positioning through the second telemetry signal.

In addition, according to an embodiment, the positioning system 200 using the low earth orbit satellite may further include an interface unit (not shown) for designating, for the low earth orbit satellite, a mode of generating the first telemetry signal to be transmitted to the ground control station and a mode of generating the second telemetry signal to be transmitted to the positioning receiver on the ground and may distinguish and generate a telemetry signal in a designated mode through the interface unit.

For example, the mode of generating the first telemetry signal may be designated for a communication period with the ground control station and the mode of generating the second telemetry signal may be designated for a noncommunication period with the ground control station. Alternatively, the mode of generating the first telemetry signal and the mode of generating the second telemetry signal may alternate with each other during the communication period (or the noncommunication period).

In the embodiments described above, the second telemetry signal may be broadcast-transmitted during a communication period with the ground control station and the positioning receiver on the ground other than the ground control station may receive and use the second telemetry signal as if the second telemetry signal is a navigation signal. However, also during a noncommunication period after the communication period, the positioning receiver on the ground may use the second telemetry signal for positioning.

During the noncommunication period after the communication period, since collected data or satellite status data is not relayed from the low earth orbit satellite, the generator 220 may further include dummy data instead of the collected data or the satellite status data and may generate the first telemetry signal.

In this case, the positioning receiver on the ground may perform positioning by using the low earth orbit satellite during the noncommunication period as well as the communication period and may precisely perform positioning by using a telemetry signal of the low earth orbit satellite even when a signal of a medium/high earth orbit satellite is not available. Thus, various location-based services may be seamlessly provided.

Figure 5:
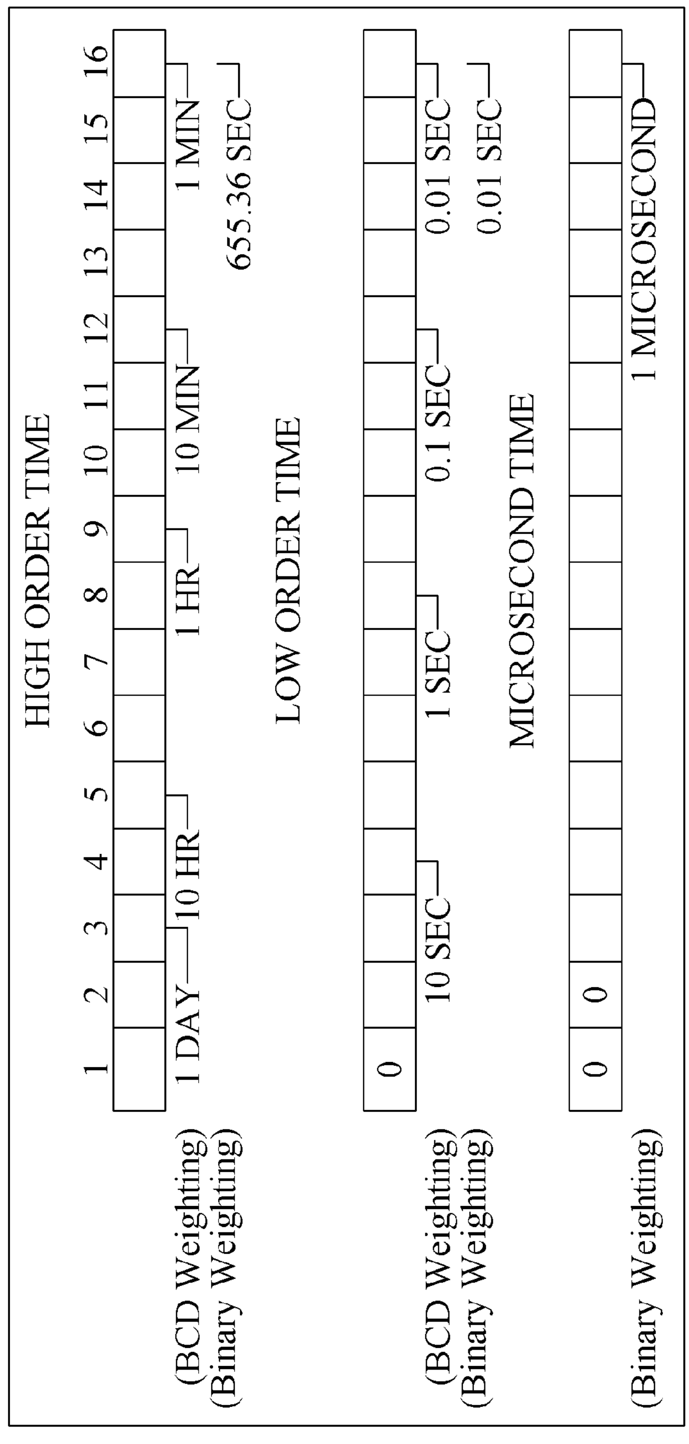

FIGS. 3 to 5 are diagrams each illustrating a frame structure of a first telemetry signal in the positioning system using a low earth orbit satellite according to an embodiment.

The first telemetry signal may be generated as a frame structured according to IRIG standard 106 as illustrated in FIG. 3.

Each frame of the first telemetry signal may include a frame sync pattern associated with a time value indicating a transmission time of the first telemetry signal and a plurality of data words associated with status/collected data relayed from the low earth orbit satellite as illustrated in FIG. 4.

In addition, the time value in the first telemetry signal may be put as a precise resolution of a microsecond as illustrated in FIG. 5, and thus, a telemetry signal including an error between a GNSS time and a reference time may be broadcast.

In other words, the positioning system using the low earth orbit satellite according to an embodiment may additionally put a start time value of a frame sync pattern synchronized with the GNSS time and a position value of the low earth orbit satellite in the frame of FIG. 4 after the frame sync pattern associated with the time value in the first telemetry signal.

Figures 6A, 6B:
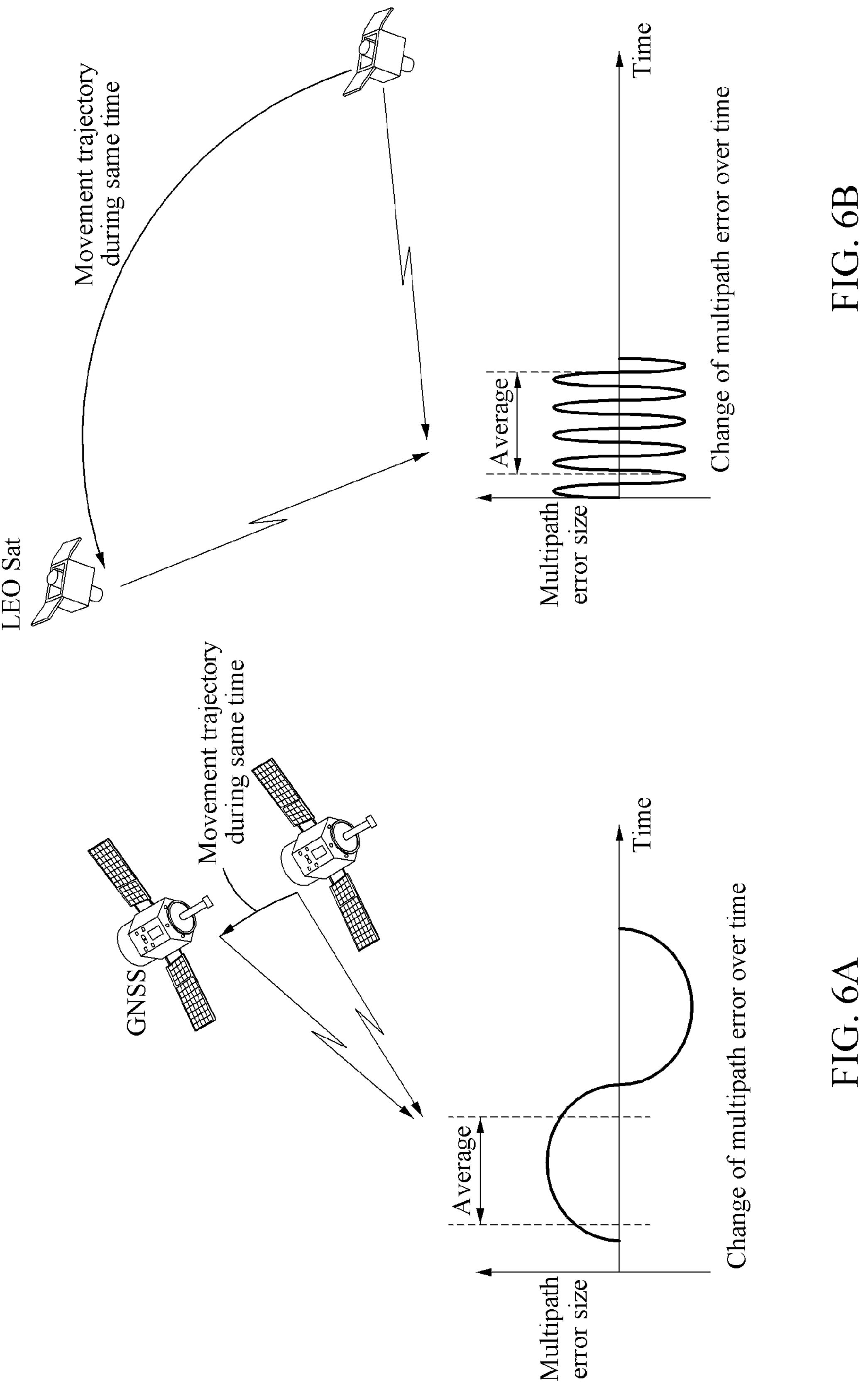
FIGS. 6A and 6B are diagrams illustrating a process of reducing a multipath error of a low earth orbit satellite in the positioning system using the low earth orbit satellite according to an embodiment.

FIGS. 6A and 6B is a diagram illustrating a process of reducing a multipath error of a low earth orbit satellite in the positioning system using the low earth orbit satellite according to an embodiment.

FIG. 6A illustrates a movement trajectory of a navigation satellite (GNSS) and FIG. 6B illustrates a movement trajectory of the low earth orbit satellite during the same time.

As illustrated in FIGS. 6A and 6B, the low earth orbit satellite has a low altitude and a relatively short orbital period, which is within 2 hours, and thus may move faster than the navigation satellite during the same time. Accordingly, a change of the movement trajectory of the low earth orbit satellite may be relatively great and Doppler may be fast.

As such, in the low earth orbit satellite with fast Doppler, a change of an error may be caused by a multipath, and the positioning system using the low earth orbit satellite according to an embodiment may reduce the error caused by the multipath through averaging within a short time.

Specifically, the positioning system using the low earth orbit satellite according to an embodiment may operate unit movement trajectories of the low earth orbit satellite at a predetermined unit time interval according to a position value of the low earth orbit satellite that is identified by a navigation signal, may calculate an error between a GNSS and a reference time of the low earth orbit satellite such that an average movement trajectory obtained by averaging the unit movement trajectories is within a designated threshold, and may adjust a time value in a first telemetry signal by applying the calculated error.

Accordingly, according to an embodiment, while reducing the error caused by the low earth orbit satellite with fast Doppler, a telemetry signal of the low earth orbit satellite may be synchronized with the GNSS time and may be transmitted to the ground such that the positioning receiver on the ground may perform positioning with high accuracy.

Figure 7:
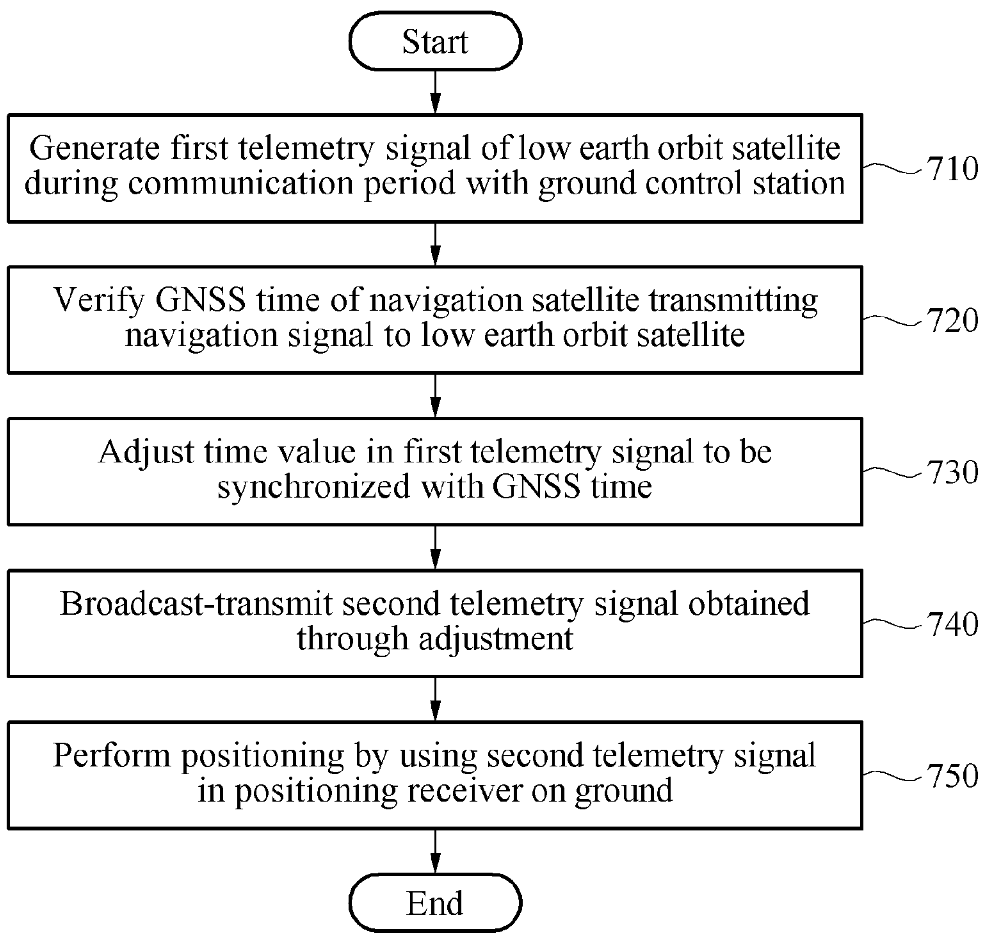
FIG. 7 is a flowchart illustrating a sequence of a positioning method using a low earth orbit satellite according to an embodiment.

FIG. 7 is a flowchart illustrating a sequence of a positioning method using a low earth orbit satellite according to an embodiment.

The positioning method using the low earth orbit satellite according to an embodiment may be performed by the positioning system 200 using the low earth orbit satellite described above.

Referring to FIG. 7, in operation 710, the positioning system 200 using the low earth orbit may generate a first telemetry signal of the low earth orbit satellite during a communication period with a ground control station.

The first telemetry signal may be generated as a frame structure, according to IRIG standard 106, including a time value (a frame sync pattern) associated with a transmission time of the first telemetry signal and data (data words) encrypting status/collected data relayed from the low earth orbit satellite.

In operation 720, the positioning system 200 using the low earth orbit satellite may verify a GNSS time in a navigation satellite transmitting a navigation signal to the low earth orbit satellite.

The positioning system 200 using the low earth orbit satellite may verify the GNSS time that is used as a reference in the navigation satellite, based on the navigation signal received from the navigation satellite, such as a GPS, a GLONASS, Galileo, or BeiDou, and may calculate an error between the verified GNSS time and a reference time that is used in the low earth orbit satellite.

In this case, the positioning system 200 using the low earth orbit satellite may operate a movement trajectory of the low earth orbit satellite according to a position value, which is identified by the navigation signal, of the low earth orbit satellite, may verify whether the movement trajectory of the low earth orbit satellite is within a threshold that is determined based on a movement trajectory of the navigation satellite moving during the same time, and may perform operation 730 when the movement trajectory of the low earth orbit satellite is within the threshold.

In operation 730, the positioning system 200 using the low earth orbit satellite may adjust the time value in the first telemetry signal to be synchronized with the GNSS time.

For example, the positioning system 200 using the low earth orbit satellite may calculate an error of the reference time of the low earth orbit satellite based on the GNSS time and may apply the calculated error to the time value associated with the transmission time of the first telemetry signal such that a telemetry signal is synchronized with the GNSS time.

In this case, the positioning system 200 using the low earth orbit satellite may operate unit movement trajectories of the low earth orbit satellite at a predetermined unit time interval and may calculate the error between the GNSS time and the reference time of the low earth orbit satellite such that an average movement trajectory obtained by averaging the unit movement trajectories operated during the communication period is within the threshold.

By doing so, the positioning system 200 using the low earth orbit satellite may synchronize the first telemetry signal with the GNSS time while reducing an error caused by a multipath of the low earth orbit satellite.

In operation 740, the positioning system 200 using the low earth orbit satellite may broadcast-transmit a second telemetry signal obtained through adjustment and, in operation 750, a positioning receiver on the ground may perform positioning by using the second telemetry signal.

As the second telemetry signal is broadcast-transmitted, the ground control station may identify the status of the low earth orbit satellite through the second telemetry signal, and the positioning receiver on the ground may perform positioning with high accuracy through the second telemetry signal.

According to an embodiment, the positioning system 200 using the low earth orbit satellite may perform the broadcast transmission of the second telemetry signal and the transmission of the first telemetry signal to the ground control station in parallel.

Accordingly, the ground control station may receive the first telemetry signal without synchronization with the GNSS time and may promptly identify the status of the low earth orbit satellite. The positioning receiver on the ground may receive the second telemetry signal without data encryption from the low earth orbit satellite and may promptly perform positioning.

As such, according to the present disclosure, by synchronizing a telemetry signal periodically generated in the low earth orbit satellite for reporting the satellite status with the reference time (the GNSS time) of the navigation signal and transmitting the synchronized telemetry signal, the positioning receiver on the ground may determine a precise position value by using the telemetry signal as if using the navigation signal.

In addition, according to the present disclosure, even when a signal of a high/medium earth orbit satellite is not available, precise positioning may be performed by using the telemetry signal of the low earth orbit satellite, and thus, seamless provision of various location-based services may be supported and the use of the telemetry signal generated in the low earth orbit satellite may be expanded other than the typical use for reporting the satellite status.

The methods according to the above-described examples may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs and/or DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher-level code that may be executed by the computer using an interpreter. The above-described devices may be configured to act as one or more software modules in order to perform the operations of the above-described embodiments, or vice versa.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

A number of embodiments have been described above. Nevertheless, it should be understood that various modifications may be made to these embodiments. Suitable results may be achieved if the described techniques are performed in a different order, and/or if components in a described system, architecture, device, or circuit are combined in a different manner, and/or replaced or supplemented by other components or their equivalents.

Therefore, other implementations, other embodiments, and equivalents to the claims are also within the scope of the following claims.

The invention claimed is:

1. A positioning system using a low earth orbit satellite, the positioning system comprises:

when a communication period with a ground control station arrives, a generator configured to generate a first telemetry signal comprising a time value according to a reference time used by the low earth orbit satellite;

a verifier configured to verify a global navigation satellite system (GNSS) time that is used as a reference by a navigation satellite from a navigation signal received from the navigation satellite;

an adjuster configured to adjust the time value comprised in the first telemetry signal to be synchronized with the GNSS time; and a transmitter configured to broadcast-transmit a second telemetry signal obtained through adjustment and cause a positioning receiver on the ground to perform positioning by using the second telemetry signal, wherein the generator is further configured to, during the communication period, encrypt collected data or status data transmitted from the low earth orbit satellite and create encrypted data, and generate the first telemetry signal further comprising the encrypted data.

2. The positioning system of claim 1, wherein the transmitter is further configured to transmit the first telemetry signal to the ground control station when broadcast-transmitting the second telemetry signal.

3. The positioning system of claim 1, wherein, when a non-communication period arrives after the communication period, the generator is further configured to generate the first telemetry signal further comprising dummy data instead of the encrypted data.

4. The positioning system of claim 1, further comprising:

an operator configured to operate unit movement trajectories of the low earth orbit satellite at a predetermined unit time interval according to a position value of the low earth orbit satellite, which is identified by the navigation signal, and the adjuster is further configured to adjust the time value comprised in the first telemetry signal such that an average movement trajectory averaging the unit movement trajectories operated during the communication period is within a designated threshold.

5. A positioning method using a low earth orbit satellite, the positioning method comprises:

when a communication period with a ground control station arrives, generating a first telemetry signal comprising a time value according to a reference time used by the low earth orbit satellite;

verifying a global navigation satellite system (GNSS) time that is used as a reference by a navigation satellite from a navigation signal received from the navigation satellite;

adjusting the time value comprised in the first telemetry signal to be synchronized with the GNSS time; and broadcast-transmitting a second telemetry signal obtained through adjustment and cause a positioning receiver on the ground to perform positioning by using the second telemetry signal, wherein the generating the first telemetry signal comprises:

during the communication period, encrypting collected data or status data transmitted from the low earth orbit satellite and creating encrypted data; and generating the first telemetry signal further comprising the encrypted data.

6. The positioning method of claim 5, further comprising:

transmitting the first telemetry signal to the ground control station when broadcast-transmitting the second telemetry signal.

7. The positioning method of claim 5, further comprising:

when a non-communication period arrives after the communication period, generating the first telemetry signal further comprising dummy data instead of the encrypted data.

8. The positioning method of claim 5, further comprising:

operating unit movement trajectories of the low earth orbit satellite at a predetermined unit time interval according to a position value of the low earth orbit satellite, which is identified by the navigation signal, and the adjusting the time value to be synchronized with the GNSS time comprises: adjusting the time value comprised in the first telemetry signal such that an average movement trajectory averaging the unit movement trajectories operated during the communication period is within a designated threshold.

9. A non-transitory computer-readable storage medium storing a program for performing the positioning method of claim 5.

* * * * *